(12) United States Patent
Fencel

(10) Patent No.: US 9,383,975 B1
(45) Date of Patent: Jul. 5, 2016

(54) PROJECTION OF SOFTWARE AND INTEGRATED CIRCUIT DIAGRAMS INTO ACTUAL 3D SPACE

(71) Applicant: Richard Stanley Fencel, Irvine, CA (US)

(72) Inventor: Richard Stanley Fencel, Irvine, CA (US)

( * ) Notice: Subject to any disclaimer, the term of this patent is extended or adjusted under 35 U.S.C. 154(b) by 238 days.

(21) Appl. No.: 14/133,059

(22) Filed: Dec. 18, 2013

Related U.S. Application Data

(60) Provisional application No. 61/849,447, filed on Jan. 28, 2013.

(51) Int. Cl.
*G06F 9/44* (2006.01)

(52) U.S. Cl.
CPC .................................... *G06F 8/34* (2013.01)

(58) Field of Classification Search
CPC .......... G06F 3/04815; G06F 17/30289; G06F 17/50; G06F 3/04812; G06F 17/2785; G06F 3/04842; G06F 15/17368; G06F 17/30598; G06F 17/30061; G09G 2354/00; G09G 2340/14; G09G 3/003; G03H 1/08; G03H 2210/441; G03H 2210/454; G06T 17/00; G06T 15/00; G06T 19/00; G06T 19/006; G06T 2210/36; G06T 2210/52; G06T 11/206; A61B 5/745; A61B 6/466
See application file for complete search history.

(56) References Cited

U.S. PATENT DOCUMENTS

| | | | | |
|---|---|---|---|---|
| 2010/0198786 A1* | 8/2010 | Imamichi | .......... | G06F 17/30292 707/626 |
| 2010/0251170 A1* | 9/2010 | Louch | ............... | G06F 17/30861 715/810 |
| 2010/0257450 A1* | 10/2010 | Go | ........................ | G06F 3/0481 715/733 |
| 2010/0299364 A1* | 11/2010 | Baldwin | ............... | G06F 17/279 707/797 |

FOREIGN PATENT DOCUMENTS

EP          2602608 A1    6/2013
WO     2013057649 A1    4/2013

OTHER PUBLICATIONS

Robin A Walker 2013 J. Phys.: Conf. Ser. 415 012076, Holograms as Teaching Agents, downloaded from http://iopscience.iop.org/1742-6596/415/1/012076 on Mar. 9, 2014.
Addy Dugdale, "Holograms are coming to the classroom", Jun. 18, 2013 [Online] downloaded from: http://www.fastcompany.com/3013158/fast-feed/holograms-are-coming-to-the-classroom on Mar. 9, 2014.

(Continued)

*Primary Examiner* — Haixia Du
(74) *Attorney, Agent, or Firm* — Patent Law Offices of Michael E. Woods; Michael E. Woods

(57) ABSTRACT

The present invention is a technique of displaying in actual 3D space (i.e. not merely a 3D representation on a 2D surface) any type of diagram relating to software or integrated circuits that requires depth perception in order to be fully comprehended. The 3D space can be manipulated as desired, including but not limited to rotation, collapse/expand, and the ability of the user to enter the 3D space and view it from within.

5 Claims, 3 Drawing Sheets

(56) References Cited

OTHER PUBLICATIONS

Tung H. Jeong, "Teaching Advanced physical concepts using display holograms", The 8th International Symposium on Display Holography <http://www.isdh.org.cn/en/index.asp> (ISDH 2009) held at Shenzhen, China Jul. 13-17, 2009 [Online]—Downloaded from http://river-valley.tv/teaching-advanced-physical-concepts-using-display-holograms/ on Mar. 9, 2014.

Leandro Soares Indrusiak et al., "3D integrated circuit layout visualization using VRML" Best of Websim 99, Future Generation Computer Systems 17, pp. 503-511 (2001).

Stanford University News Service, Engineers will soon use 'virtual reality' to design computer chips' News Release Mar. 21, 1995, url: http://news.stanford.edu/pr/95/950321Arc5314.html printed Jun. 6, 2016.

* cited by examiner

PROJECTION OF SOFTWARE AND INTEGRATED CIRCUIT DIAGRAMS INTO ACTUAL 3D SPACE

CROSS REFERENCE TO RELATED APPLICATIONS

This application claims benefit of U.S. Patent application 61/849,447 filed 28 Jan. 2013, the contents of which are hereby expressly incorporated herein in their entirety for all purposes.

FIELD OF THE INVENTION

The present invention relates generally to the projection of any kind of software or integrated circuit diagram into three-dimensional (3D) space allowing for clearer understanding of all details.

BACKGROUND OF THE INVENTION

Current 3D display of software diagrams is done using perspective drawing techniques on a two dimensional (2D) surface. An example is an exploded list of software objects (such as a table of database records). The main limitation of this approach is that each software object (e.g., database record) may be connected to additional objects (e.g. other database records) which may in turn have further connections ad infinitum (as in an object-oriented database). These complex orthogonal relationships are hard to depict on a 2D surface, making it difficult to visualize the operation of the entire system.

Similarly, 3D displays of integrated circuits also use perspective drawing techniques on a 2D surface. An example is a multi-layered integrated circuit. The limitation of this approach is analogous to that of software diagrams, that is complex orthogonal relationships are hard to depict on a 2D surface.

BRIEF SUMMARY OF THE INVENTION

In view of the foregoing disadvantages inherent in the known types of display of software and integrated circuit diagrams, the present invention provides a full depth 3D experience for such diagrams. The 3D effect can be created using stereoscopy (with or without 3D glasses), holograms, or any technique that projects an image into actual 3D space.

DETAILED DESCRIPTION OF THE INVENTION

3D Software Diagrams

Figure 1:
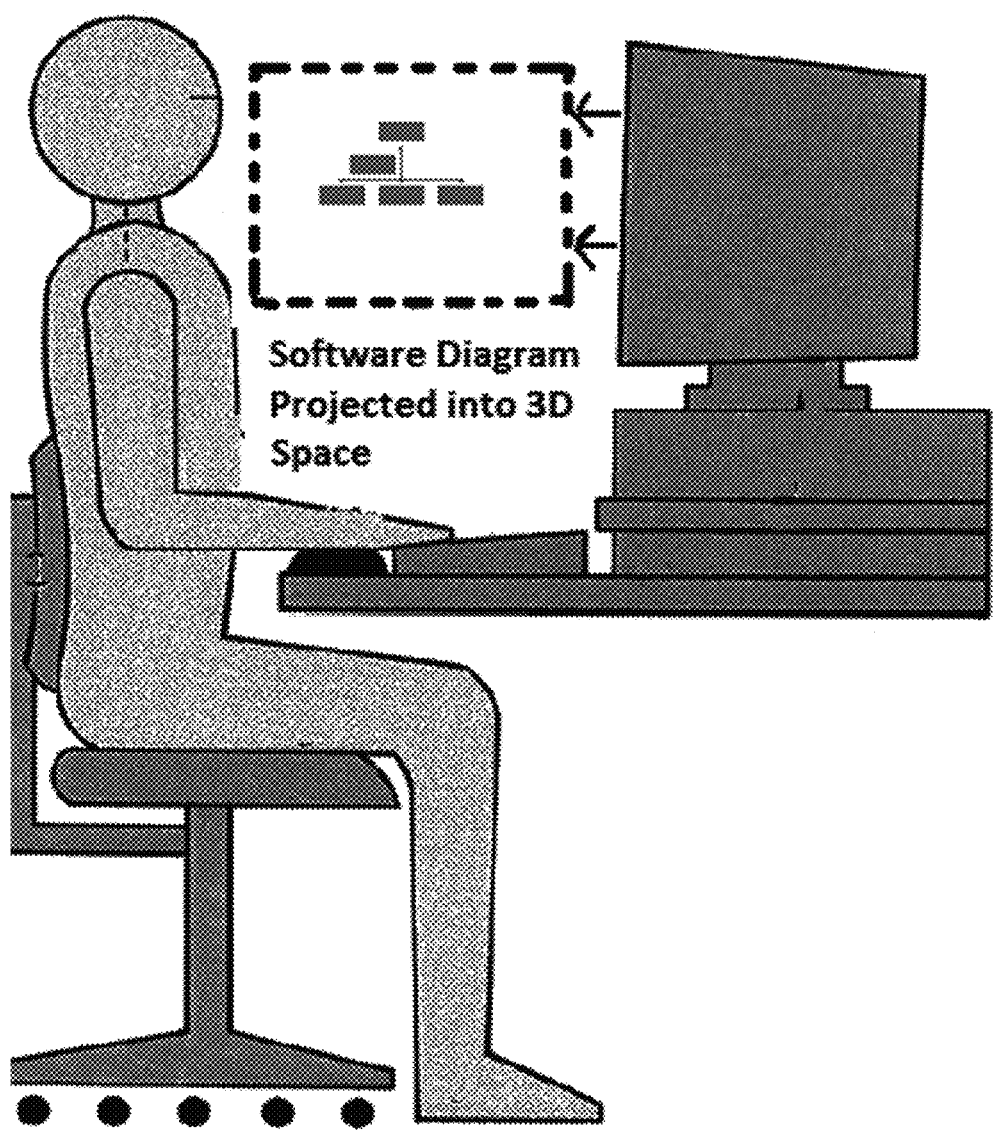
FIG. 1 illustrates projection of a software diagram into actual 3D space.

Turning now to the drawings, FIG. 1 illustrates a system using stereoscopy for projecting software diagrams into actual 3D space as opposed to merely drawing a 3D perspective onto a 2D surface.

In FIG. 1, the 3D projection is achieved using stereoscopy but could also be achieved with holograms or any other technique that projects an image into actual 3D space. The user may or may not be required to wear 3D glasses depending on the mechanism that implements the 3D effect.

The software diagrams that are most effectively displayed using the present invention are inherently three-dimensional, i.e. information is conveyed using a vertical Z-Axis as well as the horizontal X and Y axes.

Figure 2:
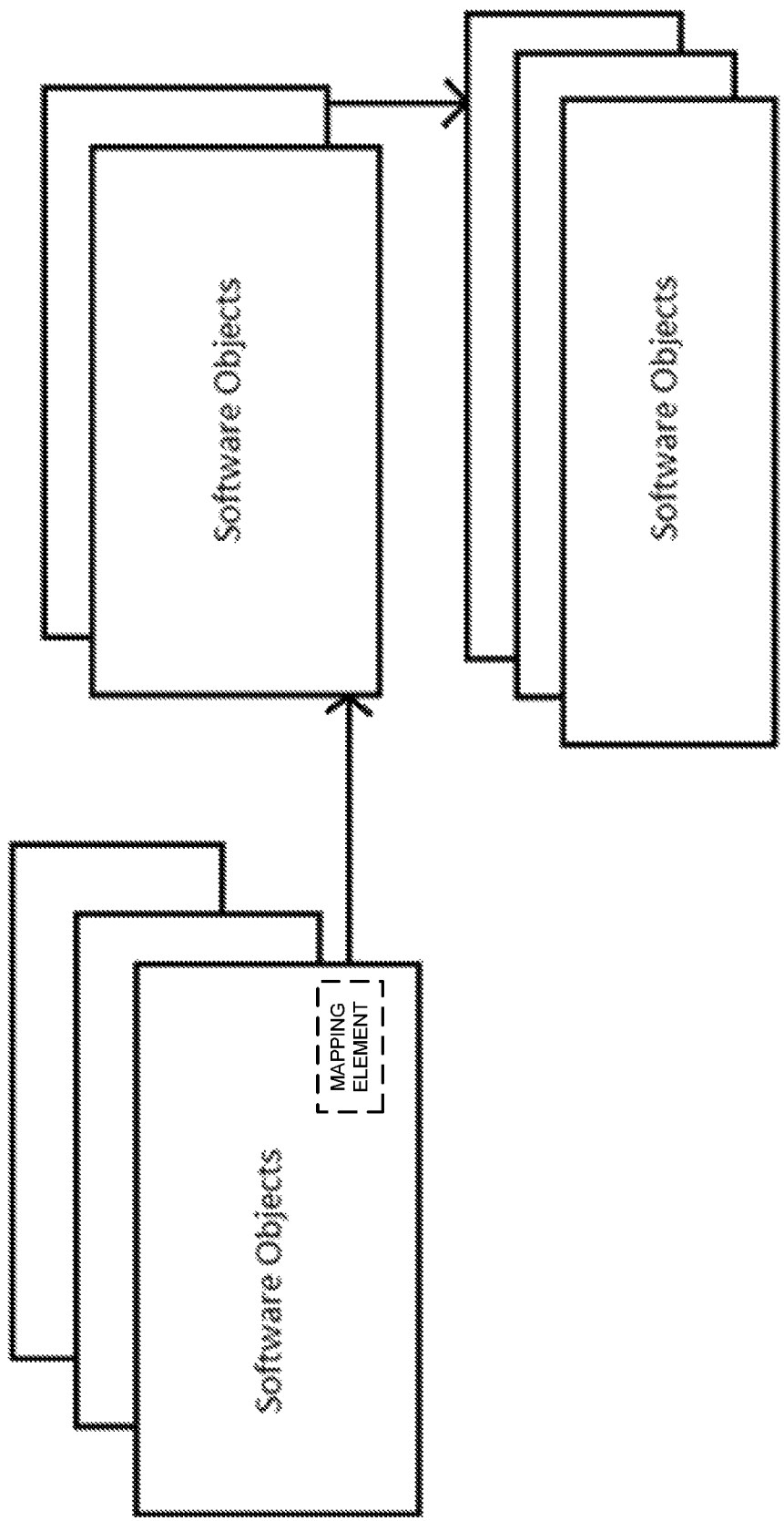
FIG. 2 illustrates a detailed view of sample 3D software diagram.

FIG. 2 is an example of such a 3D software diagram. FIG. 2 is an abstract representation of objects (for example, functional objects) that map to a series of other objects in response to an operation of a mapping element and each of the objects in the mapped-to series can in turn map to an additional series of objects. Concrete examples are (1) an object-oriented database, i.e. a database where each record in a table points to a table of other records each of which may point to additional tables; (2) lists of objects currently in memory and their interrelationships. The present invention will project this diagram into actual 3D space.

A second type of 3D software diagram well-suited to the present invention is one that illustrates the execution of a "parallel programming" application. The diagram would display, for example, the operation of concurrent processes, threads, and tasks as well as communications between them.

A third type of 3D software diagram well-suited to the present invention uses time as the third dimension. An example would be the display of variable values in a recursive function during successive calls of the function.

In general, all software diagrams where depth is important can benefit from being projected into actual 3D space using the present invention.

All of the software components in a 3D projection do not need to be displayed at once. The various components can be either not shown at all or shown collapsed with the ability to be expanded as desired. An example would be the opening of a table of database records. The present invention will allow complete "drill down" capability to allow the user to zero in on those components of interest that may be nested many layers down.

The 3D display can also be rotated to allow it to be viewed from any angle.

The user can also "enter" the display so that he sees the software object relationships from the inside. That is, the user can "wander" throughout the structures as if he were inside a building. This effect may or may not require 3D glasses.

The above techniques of display manipulation are not the only ones possible but serve as an illustration.

As an application executes, the 3D display can change in real-time in order to reflect changes in the application's state. For example, in an object-oriented data base, the user can watch software objects as they get populated using both eager and lazy loading. It would also be possible to view intermediate results of certain operations such as nested joins in a database query. Viewing dynamically the internal workings in 3D, especially from within, would help reveal bottlenecks and other design flaws. These are some but not all the real-time viewing scenarios that are possible.

There will also exist a "2D" mode where all the above features are available but are instead shown on a 2D surface with all the limitations of a 2D display.

3D Integrated Circuit Diagrams

Figure 3:
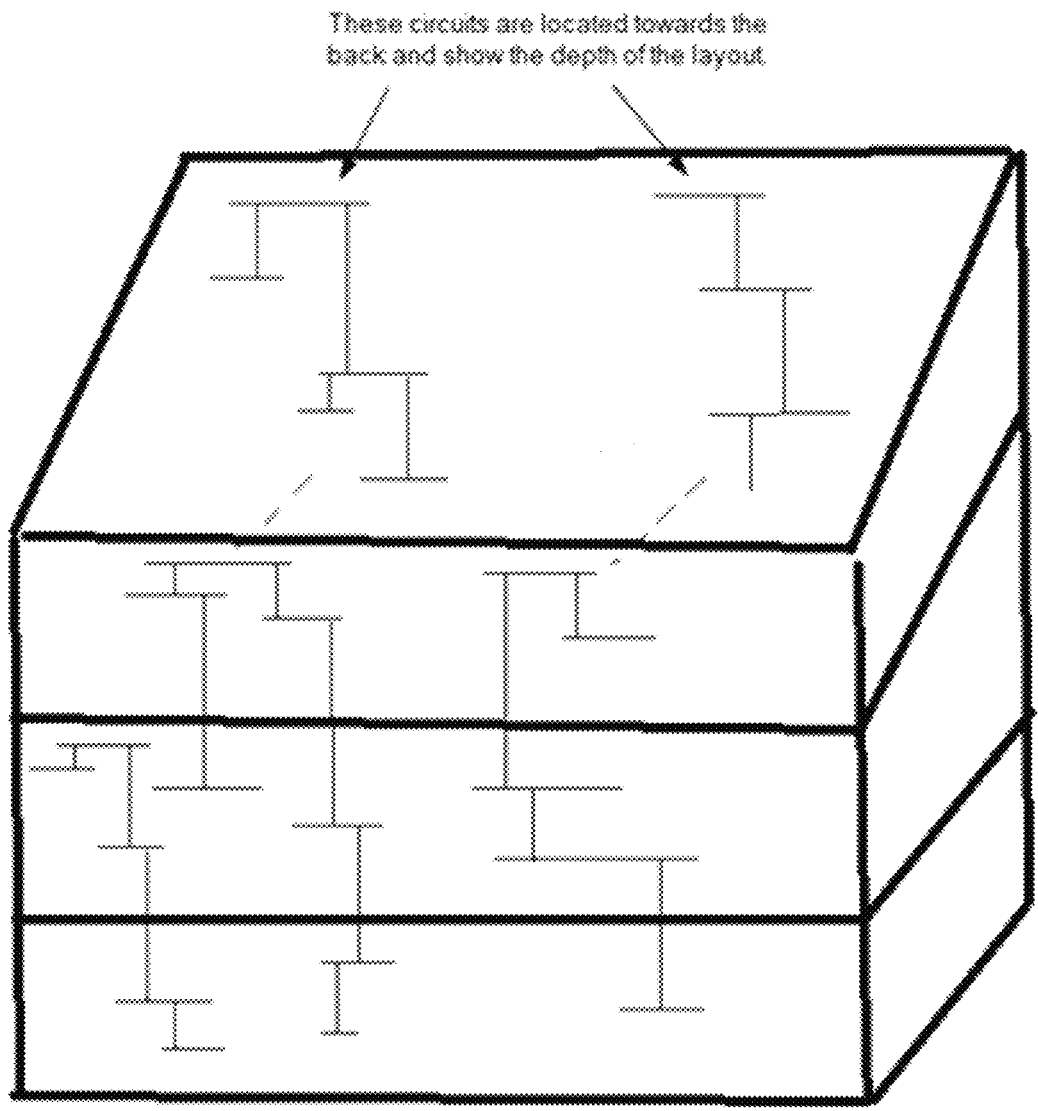
FIG. 3 illustrates a detailed view of a sample 3D integrated circuit diagram.

FIG. 3 is an example of a 3D diagram for integrated circuits. The present invention will project this diagram into actual 3D space, allowing all the circuitry with its vertical and horizontal interconnects to be viewed without the obfuscation of 2D perspective.

This projection would be analogous to the projection of software diagrams. That is, the projection could be implemented with stereoscopy as shown in FIG. 1 or be achieved with holograms or any other technique that projects an image into actual 3D space. The user may or may not be required to wear 3D glasses depending on the mechanism that implements the 3D effect.

Just as in the 3D software diagrams, all the components of the 3D integrated circuit do not need to be displayed at once. It will be possible to collapse certain components and then "drill down" to those of interest.

Also like the 3D projection of software diagrams, the 3D diagram can be rotated or viewed from any angle. The diagram, in this case the integrated circuit, can also be "entered", allowing the user to wander throughout its structure allow the user to detect design flaws.

The above techniques of display manipulation are not the only ones possible but serve as an illustration.

It would also be possible to simulate the execution of the integrated circuit, showing the voltages at various nodes and times depending on location, lead lengths, etc. Viewing the internal workings in real 3D would allow the user to optimize the design.

There will also exist a "2D" mode where all the above features are available but are instead shown on a 2D surface with all the limitations of a 2D display.

Other Kinds of 3D Design

The above described approach to using 3D projection could also be applied to any form of design, such as aircraft, automobiles, ships, hand tools etc.

What is claimed as new and desired to be protected by Letters Patent of the United States is:

1. A computer-implemented method for a three-dimensional projection of a set of objects onto a display supporting multiple depths, each object including an X axis, a Y axis, and a Z axis, comprising:
   a) presenting a first subset of objects on the display at a first particular display depth, a functional object in said first subset of objects including a mapping element wherein said first subset of objects is selected from the set of objects;
   b) detecting a user selection of said mapping element triggering a projection event; and
   c) presenting, responsive to said projection event, a second subset of objects on the display at a second particular display depth different from said first particular display depth, wherein said second subset of objects is selected from the set of objects;
   wherein the three-dimensional projection includes a data model including the set of objects, said data model including a set of predetermined relationships between said first subset of objects and said second subset of objects wherein one or more relationships of said set of predetermined relationships are visualized by said presenting step c);
   wherein said data model includes a dynamic parallel processing model including a first plurality of processes within said first subset of objects, a second plurality of processes within said second subset of objects, and wherein said predetermined relationships includes communications between said processes of said first subset of objects and said second subset of objects.

2. A computer-implemented method for a three-dimensional projection of a set of objects onto a display supporting multiple depths, each object including an X axis, a Y axis, and a Z axis, comprising:
   a) presenting a first subset of objects on the display at a first particular display depth, a functional object in said first subset of objects including a mapping element wherein said first subset of objects is selected from the set of objects;
   b) detecting a user selection of said mapping element triggering a projection event; and
   c) presenting, responsive to said projection event, a second subset of objects on the display at a second particular display depth different from said first particular display depth, wherein said second subset of objects is selected from the set of objects;
   wherein the three-dimensional projection includes a data model including the set of objects, said data model including a set of predetermined relationships between said first subset of objects and said second subset of objects wherein one or more relationships of said set of predetermined relationships are visualized by said presenting step c);
   wherein said data model includes an integrated circuit model, wherein the set of objects includes integrated circuit component representations of functional elements of said integrated circuit model, wherein said first subset of objects include a first subset of integrated circuit components, wherein said second subset of objects includes a second subset of integrated circuit components of said integrated circuit model, and wherein said predetermined relationships represent electrical communication between components of said first subset and associated electrical components of said second subset.

3. The computer-implemented model of claim 2 wherein a particular one electronic component of said first subset includes said mapping element, wherein said particular one electronic component is electrically associated with said second subset of objects, and wherein said projection event of said particular electronic component projects said second plurality of components with the display visualizing said electrical associations.

4. The computer implemented method of claim 3 wherein said electrical associations includes dynamic associations of states of the set of objects, including one or more of simulated voltage values at one or more selected nodes at one or more selected times.

5. A computer-implemented method for a three-dimensional projection of a set of objects onto a display supporting multiple depths, each object including an X axis, a Y axis, and a Z axis, comprising:
   a) presenting a first subset of objects on the display at a first particular display depth, a functional object in said first subset of objects including a mapping element wherein said first subset of objects is selected from the set of objects;
   b) detecting a user selection of said mapping element triggering a projection event; and
   c) presenting, responsive to said projection event, a second subset of objects on the display at a second particular display depth different from said first particular display depth, wherein said second subset of objects is selected from the set of objects;
   wherein the three-dimensional projection includes a data model including the set of objects, said data model including a set of predetermined relationships between said first subset of objects and said second subset of objects wherein one or more relationships of said set of predetermined relationships are visualized by said presenting step c);
   wherein data model includes a dynamic recursive processing model, wherein the plurality of data objects includes a recursive function generating a series of variable values from a series of successive calls to said recursive function, wherein said first subset of objects includes a first time-dependent value for said variable value responsive to a first particular one successive call of said series of successive calls, and wherein said second subset of objects includes a second time-dependent value for said variable value responsive to a second particular one successive call of said series of successive calls, said second particular one successive call next is said series to said first particular one successive call.

\* \* \* \* \*